United States Patent [19]
Nakajima et al.

[11] Patent Number: 5,631,096
[45] Date of Patent: May 20, 1997

[54] MAGNETO OPTICAL MEMORY DEVICE

[75] Inventors: Junsaku Nakajima, Yamatotakada; Yoshiteru Murakami, Nishinomiya; Kenji Ohta, Kitakatsuragi-gun; Akira Takahashi, Nara, all of Japan

[73] Assignee: Sharp Kabushiki Kaisha, Osaka, Japan

[21] Appl. No.: 400,464

[22] Filed: Mar. 7, 1995

Related U.S. Application Data

[63] Continuation of Ser. No. 102,553, Aug. 5, 1993, abandoned.

Foreign Application Priority Data

Sep. 2, 1992 [JP] Japan .................................. 4-234486

[51] Int. Cl.$^6$ ............................................ G11B 5/66
[52] U.S. Cl. ........................ 428/694 ML; 428/694 SC; 428/694 EC; 428/694 RE; 428/694 NF; 428/694 MM; 428/900; 369/13; 365/122
[58] Field of Search ................... 428/694 ML, 694 SC, 428/694 RE, 694 NF, 900, 694 MM, 694 EC; 369/13; 365/122

[56] References Cited

U.S. PATENT DOCUMENTS 5,278,810  1/1994  Takahashi et al. ...................... 369/13

FOREIGN PATENT DOCUMENTS

| 258978 | 3/1988 | European Pat. Off. . |
|---|---|---|
| 0318925A3 | 6/1989 | European Pat. Off. . |
| 0352548A2 | 1/1990 | European Pat. Off. . |
| 0498459A2 | 8/1992 | European Pat. Off. . |
| 0509836A2 | 10/1992 | European Pat. Off. . |

OTHER PUBLICATIONS

M. Kaneko et al., *Jpn. J. Appl. Phys.*, 31, Pt. 1, No. 2B, pp. 568–575 ((1992).

*Primary Examiner*—Leszek Kiliman
*Attorney, Agent, or Firm*—David G. Conlin; Milton Oliver

[57] ABSTRACT

A magneto-optical memory device is provided with a base whereon a first magnetic film which exhibits in-plane magnetization at room temperature and exhibits perpendicular magnetization at above room temperature, a second magnetic film having its Curie temperature above room temperature; and a third magnetic film having its Curie temperature set above the Curie temperature of the second magnetic film, which exhibits perpendicular magnetization in a temperature range between room temperature and Curie temperature are laminated in this order. When recording, the temperature of the third magnetic film is raised to the vicinity of its Curie temperature, and information is recorded thereon by an external magnetic field. As the magnetization of the second magnetic film having a temperature rise above its Curie temperature disappears, an exchange coupling force is not exerted between the first magnetic film and the third magnetic film. In the above arrangement, since the effect from the magnetization of the first magnetic film can be avoided, information can be recorded on the third magnetic film by a small external magnetic field, thereby permitting a reduction in electric power consumption and in the size of the apparatus.

24 Claims, 15 Drawing Sheets

MAGNETO OPTICAL MEMORY DEVICE

This is a continuation of application Ser. No. 08/102,553, filed on Aug. 5, 1993, now abandoned.

FIELD OF THE INVENTION

The present invention relates to a magneto-optical memory device such as a magneto-optical disk, etc., on or from which recording, erasing, or reproducing of information is permitted using light such as a laser beam.

BACKGROUND OF THE INVENTION

As an example of a magneto-optical memory device, a magneto-optical disk provided with a substrate whereon a first dielectric film, a recording-reproduction film, a second dielectric film, a reflecting film, and an overcoat film are laminated in this order is known.

For the recording-reproduction film, a thin film of rare-earth transition metal alloy (RE-TM) having perpendicular magnetic anisotropy such as DyFeCo, TbFeCo, or GdTbFe is used.

When recording is to be carried out on the magneto-optical disk, light such as a laser beam is projected onto the recording-reproduction film. As a result, temperature of the portion irradiated with the light is raised, and the coercive force (Hc) at the portion becomes small. Then, the magnetization direction of the portion is arranged in the magnetization direction of an external magnetic field, thereby recording information in a form of recording bits.

When reproducing is to be carried out from the magneto-optical disk, a linearly polarized light is projected onto the recording bits recorded on the recording-reproduction film, and the information is reproduced utilizing the Kerr effect (the rotation angle of the linearly polarized light varies depending on the magnetization direction of the recording bits). When adopting the above reproducing method, the recording bits recorded with an interval smaller than the diameter of the light spot on the recording-reproduction film cannot be reproduced.

In order to counteract the above problem, recently, a magneto-optical recording disk which enables recording bits recorded with an interval smaller than the diameter of the light spot has been proposed. Namely, even when a plurality of recording bits are recorded in the area where the light spot is formed, each of the recording bits can be reproduced (see Jpn. J. Appl. Phys. Vol. 31 (1992) Pt. 1, No. 2B).

As shown in FIG. 27, the magneto-optical disk is mainly composed of a substrate 81 whereon a read-out film 83 and a recording film 84 (magnetic thin film with a perpendicular magnetization) are laminated. The recording film 84 has high coercive force at room temperature. The coercive force of the read-out film 83 is set smaller than the coercive force of the recording film 84. When temperature of the reproducing portion of the read-out film 83 is raised, the magnetization direction of the read-out film 83 is arranged in the magnetization direction of the recording film 84. Namely, by the exchange coupling force exerted between the read-out film 83 and the recording film 84, the magnetization of the recording film 84 is copied to the read-out film 83.

The recording on the magneto-optical disk is carried out through the generally adopted magneto-optical recording method. When the recording bits recorded on the magneto-optical disk are to be reproduced, the read-out film 83 is required to be initialized beforehand so that the magnetization direction of the read-out film 83 is arranged in a predetermined direction (upward in the figure) by applying thereto the subsidiary magnetic field from a subsidiary magnetic field generation device 86. Then, the reproduction-use beam is projected onto the read-out film 83 through a lens 98, and the temperature of the portion irradiated with the beam is raised. As a result, the magnetized information recorded on the recording film 84 is copied to the read-out film 83.

In this way, the magnetized information is copied only to the central portion of the light spot of the reproduction-use light beam. As a result, the recording bits recorded with an interval smaller than the light spot can be reproduced.

However, in the above conventional arrangement, when reproducing is to be carried out, the magnetization of the read-out film 83 must be initialized beforehand by the subsidiary magnetic field generation device 86. Therefore, the above arrangement presents the problem that the magneto-optical recording and reproduction device becomes larger in size.

SUMMARY OF THE INVENTION

An object of the present invention is to provide a magneto-optical memory device which permits high density recording by enabling recording bits, recorded with an interval smaller than a diameter of a light spot, to be reproduced and which permits the size of a device which adopts the magneto-optical memory device and the electric power consumption to be reduced.

In order to achieve the above object, the magneto-optical memory device in accordance with the present invention is characterized by including:

a first magnetic film which exhibits in-plane magnetization at room temperature and exhibits perpendicular magnetization in a predetermined temperature range above room temperature;

a second magnetic film having Curie temperature set above room temperature; and a third magnetic film which exhibits perpendicular magnetization in a temperature range between room temperature and Curie temperature, the first magnetic film, the second magnetic film, and the third magnetic film being laminated in this order on a base, and wherein Curie temperature of the second magnetic film is set lower than the Curie temperature of the third magnetic film.

In the above arrangement, when reproducing, a light spot is formed on the first magnetic film at the portion irradiated with the light beam. Additionally, the smallest limit of the size of the light spot is determined by the wavelength of the light beam, the numerical aperture (NA) of the objective.

When the light spot is formed on the first magnetic film, temperature of the central portion of the light spot is raised in a predetermined temperature range, and only the central portion of the light spot exhibits perpendicular magnetization.

As a result, the recording bits recorded on the third magnetic film at high density are copied to the portion which exhibits perpendicular magnetization of the first magnetic film through the second magnetic film by the exchange coupling force. Namely, the magnetization direction of the third magnetic film is copied to the portion corresponding to the central portion of the light spot on the first magnetic film.

Because only the central portion of the light spot on the first magnetic film exhibits perpendicular magnetization, the recording bits recorded on the third magnetic film with an interval smaller than the diameter of the light spot can be reproduced by copying the recording bits recorded on the third magnetic film to the first magnetic film, thereby enabling the recording bits recorded at high density to be reproduced.

In the above arrangement, unlike the conventional model, the subsidiary magnetic field generation device for initializing the magnetization of the first magnetic film is not required when reproducing.

On the other hand, when recording is to be carried out, the temperature of the portion which exhibits perpendicular magnetization of the third magnetic film is raised to the vicinity of Curie temperature, and the coercive force thereof becomes small. As a result, by changing the magnetization direction of an external magnetic field, the magnetization direction of the third magnetic film is recorded in a form of recording bits.

In the above arrangement, since the second magnetic film, whose Curie temperature is set lower than that of the third magnetic film, is provided between the first magnetic film and the third magnetic film, the temperature of the second magnetic film is raised to or above its Curie temperature. Thus, the magnetization of the second magnetic film disappears, and the exchange coupling force is not exerted between the first magnetic film and the third magnetic film. Therefore, the magnetization direction of the first magnetic film does not affect the third magnetic film, thereby enabling the recording bits to be recorded on the third magnetic layer by the external magnetic field smaller than that required in the conventional model.

As described, because the above arrangement does not require the subsidiary magnetic field generation device when reproducing, and the external magnetic field required when recording can be made smaller, a compact size for the apparatus and a reduction in electric energy consumption are made possible.

For a fuller understanding of the nature and advantages of the invention, reference should be made to the ensuing detailed description taken in conjunction with the accompanying drawings.

DESCRIPTION OF THE EMBODIMENTS

Embodiment 1

The following description will discuss the first embodiment of the present invention with reference to FIGS. 1 through 10.

Figure 1:
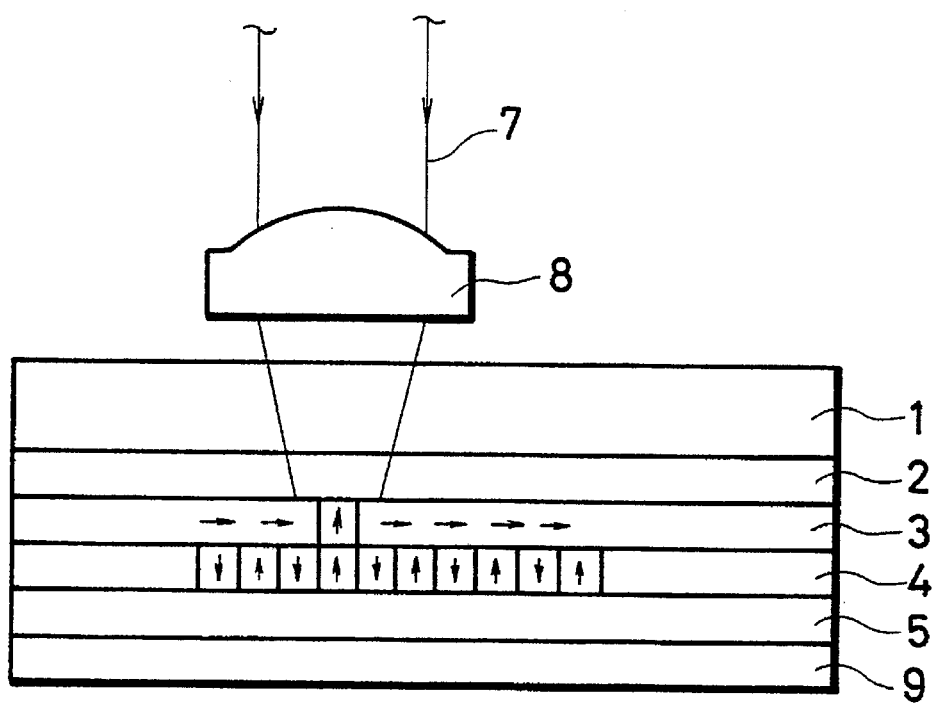
FIG. 1 is an explanatory view showing a reproducing operation from a magneto-optical recording medium adopted in the first embodiment of the present invention.

As shown in FIG. 1, a magneto-optical disk (magneto-optical memory device) in accordance with the present embodiment is provided with a substrate 1 (base) whereon a transparent dielectric film 2, a read-out film 3 (first magnetic film), a recording film 4 (third magnetic film), a transparent dielectric film 5, and an overcoat film 9 are laminated in this order.

Figure 3:
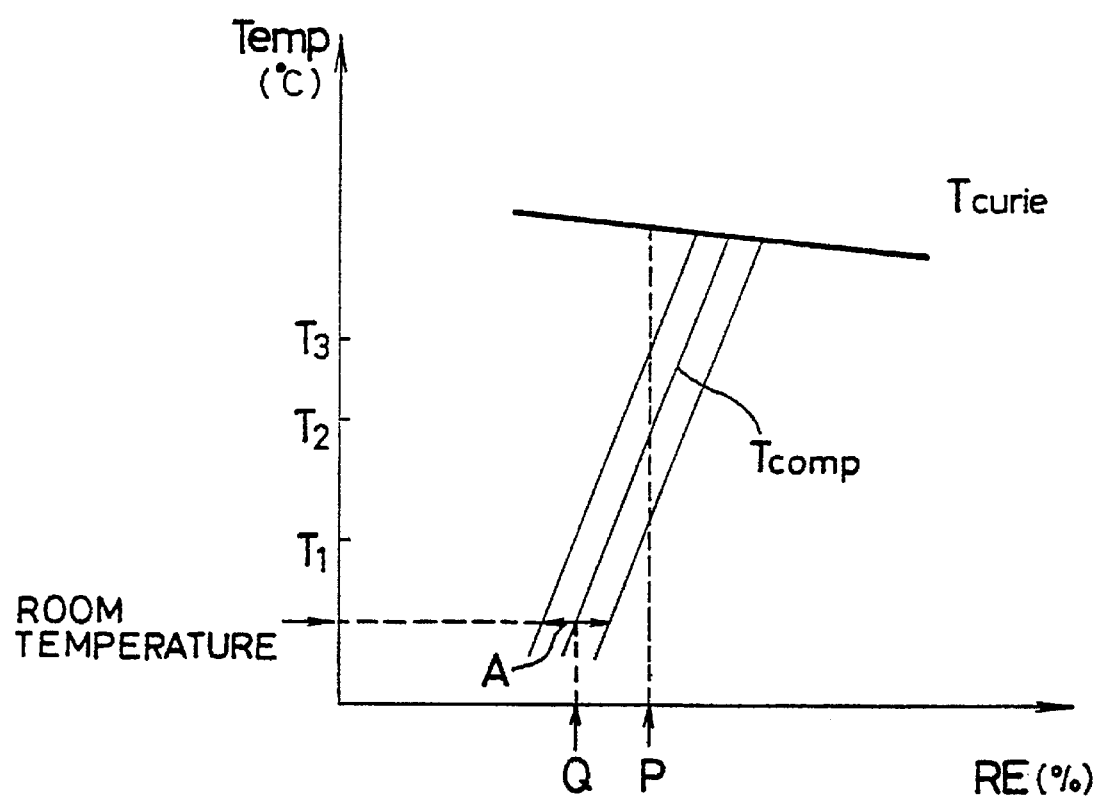
FIG. 3 is a diagram showing the magnetic condition of a read-out film of the present invention.

For the read-out film 3, amorphous alloy of rare-earth transition metal (hereinafter referred to as RE-TM) is used. FIG. 3 shows the magnetic condition of RE-TM. As can be seen from the figure, the range A where RE-TM exhibits perpendicular magnetization at room temperature is extremely narrow. This is because perpendicular magnetization appears only in the vicinity of a compensating composition where the magnetic moments of the rare-earth metal and the transition metal balance with one another.

Additionally, the magnetic moments of the rare-earth metal and the transition metal have different temperature dependencies. Namely, when the temperature is raised, the percentage of decrease in the magnetic moment of the transition metal is less than that of the rare-earth metal.

Therefore, when the alloy (P in the figure) wherein the content of the rare-earth metal is set greater than that in the compensating composition at room temperature (Q in the figure) is adopted, the alloy can be arranged such that it does not exhibit perpendicular magnetization but exhibits in-plane magnetization at room temperature, whereas, it exhibits perpendicular magnetization at above predetermined temperature.

More concretely, as the temperature of the portion irradiated with the light beam is raised, the magnetic moment of the transition metal becomes relatively greater until it balances with the magnetic moment of the rear-earth metal, and the alloy exhibits perpendicular magnetization as a whole. Therefore, by adopting alloy having the above characteristic for the read-out film 3, the magneto-optical disk of the present embodiment permits high density recording.

Figure 4:
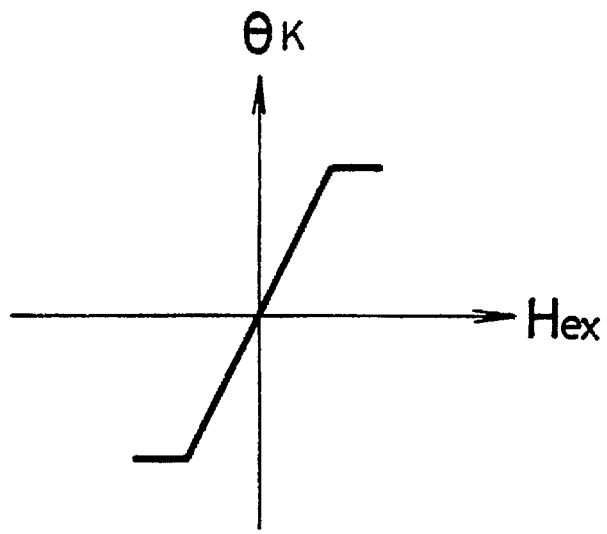
FIG. 4 is an explanatory view showing the relationship between an external magnetic field applied to the read-out film of FIG. 3 and a magnetic Kerr rotation angle in a temperature range of room temperature—$T_1$.
Figure 5:
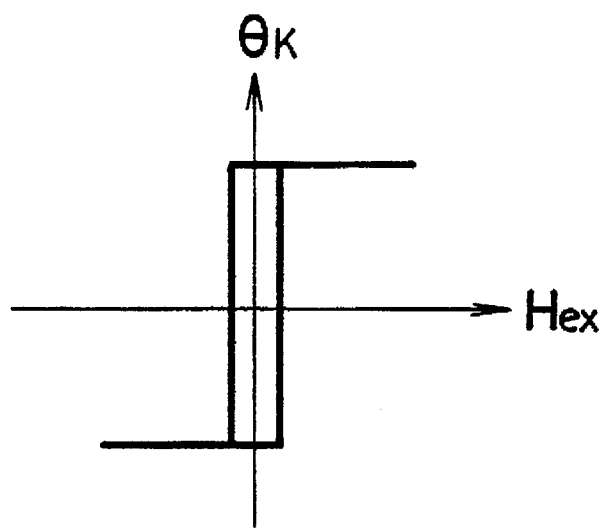
FIG. 5 is an explanatory view showing the relationship between an external magnetic field applied to the read-out film of FIG. 3 and a magnetic Kerr rotation angle in a temperature range of $T_1$–$T_2$.
Figure 6:
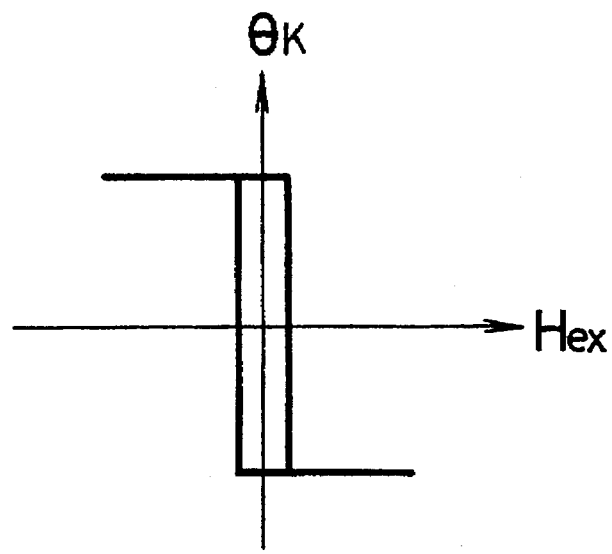
FIG. 6 is an explanatory view showing the relationship between an external magnetic field applied to the read-out film of FIG. 3 and a magnetic Kerr rotation angle in a temperature range of $T_2$–$T_3$.
Figure 7:
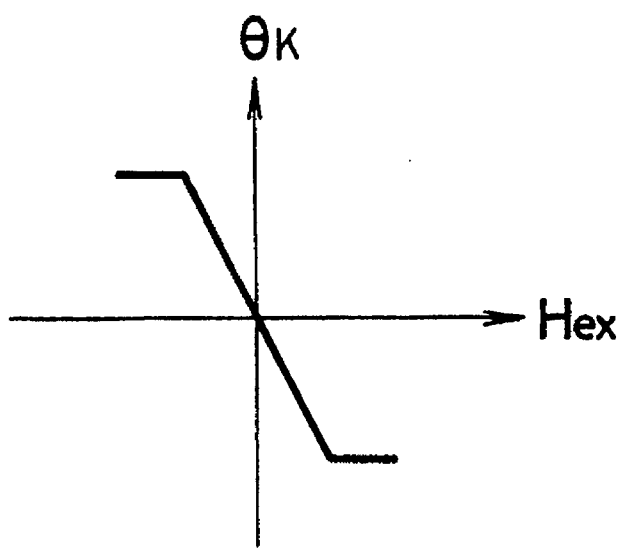
FIG. 7 is an explanatory view showing the relationship between an external magnetic field applied to the read-out film of FIG. 3 and a magnetic Kerr rotation angle in a temperature range of $T_3$—Curie temperature.

FIGS. 4 through 7 show relationship between the external magnetic field Hex to be applied onto the read-out film 3 and the magnetic Kerr rotation angle θk (hysteresis characteristic). FIG. 4 shows hysteresis characteristic in a temperature range of room temperature—$T_1$. FIG. 5 shows hysteresis characteristic in the temperature range of $T_1$–$T_2$. FIG. 6 shows hysteresis characteristic in the temperature range of $T_2$–$T_3$. FIG. 7 shows the hysteresis characteristic in the temperature range of $T_3$–Tc.

As can be seen from the above figures, the alloy shows an abruptly rising hysteresis characteristic in the temperature range of $T_1$–$T_3$. On the other hand, it does not show hysteresis characteristic in a temperature range of room temperature—$T_1$ and in a temperature range of $T_3$–Tc.

In the present embodiment, $Gd_{0.28}$ $(Fe_{0.8}Co_{0.2})_{0.72}$, more preferably $Gd_{0.28}$ $(Fe_{0.82}Co_{0.18})_{0.72}$, may be adopted for the read-out film 3 with the thickness of 50 nm. Here, the Curie temperature of the read-out film 3 is set in the range of 300–400 C°. For the previously described reason, the read-out film 3 is set such that the content of the rare-earth metal is set greater than that of the compensating composition at room temperature, and that the compensating composition appears at the vicinity of 100 C°.

For the recording film 4, $Dy_{0.23}$ $(Fe_{0.82}Co_{0.18})_{0.77}$ with the thickness of 20 nm is adopted, and the Curie temperature is set in the range of 150–250 C°.

For the transparent dielectric film 2, a dielectric film such as AlN, SiN, AlSiN, etc., is used. Here, the thickness of the film is set substantially the value obtained by dividing a quarter of a reproducing wavelength by a refractive index. For example, when the light beam with the wavelength of 800 nm is adopted in reproducing, the film thickness of the transparent dielectric film 2 is set in the range of 10–80 nm. Here, the transparent dielectric film 5 is a protective coat made of nitride with the thickness of 50 nm.

In the above arrangement, when reproducing operation is to be carried out, a reproduction-use light beam 7 (perpendicular incident light) is projected onto the read-out film 3 through a converging lens 8 from the side of the substrate 1. As a result, the temperature of the portion of the read-out film 3, corresponding to the vicinity of the central portion of the light spot of the light beam 7 is raised, for example, to the vicinity of 70° C.

This is because the light intensity of the light beam 7 shows Gaussian distribution, and temperature of the reproducing portion of the magneto-optical disk also shows Gaussian distribution. Thus, the area having a temperature rise above 70° C. is smaller than the area of the light spot of the light beam 7.

Therefore, in the arrangement of the present embodiment, for example, when the information is recorded on the recording film 4 in the magnetization direction shown in FIG. 1, in the area of the read-out film 3 having the temperature rise above 70° C., a transition occurs from in-plane magnetization to perpendicular magnetization. As a result, by the exchange coupling force exerted between the read-out film 3 and the recording film 4, the magnetization direction of the recording film 4 is copied to the read-out film 3.

Further, when the transition occurs from in-plane magnetization to perpendicular magnetization at the portion having a temperature rise of the read-out film 3, only the portion corresponding to the central portion of the light spot of the light beam 7 shows the magneto-optical Kerr effect, and the information recorded on the recording film 4 is reproduced based on the reflected light from the central portion of the light spot.

As described, because the reproducing operation is carried out only from the portion having a temperature raise above 70° C., the recording bits recorded with an interval smaller than the diameter of the light spot of the light beam 7 can be reproduced, and this permits a significant improvement of the recording density.

On the other hand, temperature of the portion of the read-out film 3 other than the portion corresponding to the central portion of the light spot of the light beam 7 is not raised above predetermined temperature, and in-place magnetization remains. Thus, the portion exhibiting in-plane magnetization does not show the magneto-optical Kerr effect with respect to the light beam 7.

Moreover, as the light beam 7 is shifted so as to reproduce the next recording bit, the temperature of the previous reproducing portion drops, and the transition occurs at the portion from perpendicular magnetization to in-plane magnetization. With a drop in temperature, since the portion does not show the magneto-optical Kerr effect anymore, entering of the signal from the adjacent bits can be prevented, thereby preventing generation of noise.

When recording and reproducing of information are carried out on and from the above magneto-optical disk, only the portion corresponding to the central portion of the light spot of the light beam 7 shows magneto-optical effect. Thus, as long as the strength of the reproducing signal is ensured, reproduction of the small recording bits is enabled, for example, in the case where a plurality of recording bits exist in the area where the light spot of the light beam 7 is formed, and the recording density can be significantly improved. Moreover, the above arrangement is improved from the conventional model in that the subsidiary magnetic field generation device for initializing the magnetization of the read-out film is not required.

In the above arrangement of the present embodiment, when the temperature of the portion irradiated with the light beam 7 is raised above the vicinity of 70° C., the transition occurs from in-plane magnetization to perpendicular magnetization. On the other hand, the temperature of the other portion is not raised above the vicinity of 70° C., and in-plane magnetization remains. As a result, the reproduction of the recording bits recorded with an interval smaller than the diameter of the light beam 7 can be surely performed.

Additionally, the material for the read-out film 3 is not limited to $Gd_{0.28}(Fe_{0.8}Co_{0.2})_{0.72}$. For example, $Gd_{0.25}Co_{0.75}$ may be used as well. Since $Gd_{0.25}Co_{0.75}$ has smaller coercive force than $Gd_{0.28}(Fe_{0.8}Co_{0.2})_{0.72}$, when recording, disturbing factor can be made smaller for the external magnetic field.

Embodiment 2

Figure 2:
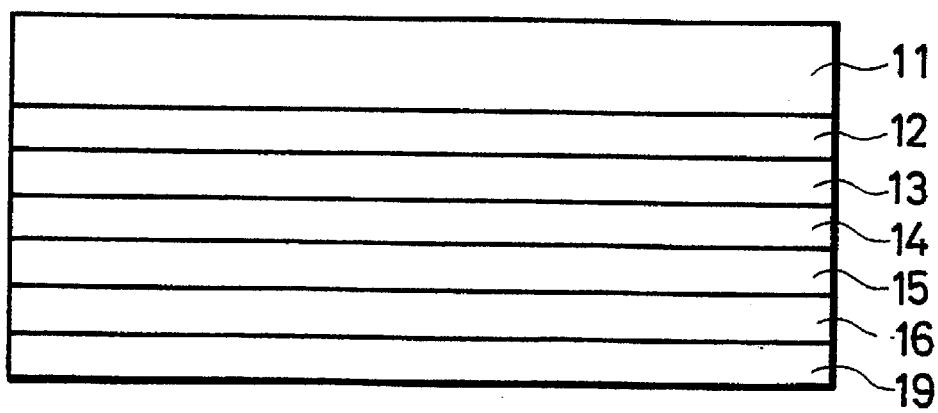
FIG. 2 is an explanatory view showing the configuration of another magneto-optical recording medium of the present invention.

The following description will discuss the second embodiment of the present invention with reference to FIG. 2. A magneto-optical disk of the present embodiment has the same arrangement as that of the first embodiment, except that a reflecting film is provided.

As shown in FIG. 2, the magneto-optical disk (magneto-optical memory device) of the present embodiment is provided with a substrate 11 whereon a transparent dielectric film 12, a read-out film 13, a recording film 14, a transparent dielectric film 15, a reflecting film 16, and an overcoat film 19 are laminated in this order.

Although the reflecting film 16 is provided for enhancing the magneto-optical effect, the substrate 11, the transparent dielectric film 12, the recording film 14, the transparent dielectric film 15, and the overcoat film 19 of the present embodiment have the same configurations and the characteristics as the substrate 1, the transparent dielectric film 2, the recording film 4, the transparent dielectric film 5, and the overcoat film 9 of the first embodiment. Thus, the detailed descriptions thereof shall be omitted here.

In the present embodiment, the respective film thicknesses of the transparent dielectric film 12, the read-out film 13, the recording film 14, the transparent dielectric film 15, and the reflecting film 16 are set 80 nm, 15 nm, 15 nm, 30 nm, and 50 nm.

In the arrangement of the present embodiment, a reproduction-use light beam (not shown) is projected onto the read-out film 13 from the side of the substrate 11 through the converging Kens (not shown). Among the components of the light beam, those transmitted through the recording film 14 and the transparent dielectric film 15 are reflected from the reflecting film 16.

In the above arrangement, when the information is recorded on the recording film 14 in a predetermined magnetization direction (for example, in the magnetization direction shown in FIG. 1), only the portion corresponding to the central portion of the light spot of the light beam of the read-out film 13 is raised to the vicinity of 70° C. This is because the temperature distribution of the read-out film 13 whereon the light beam is projected shows Gaussian distribution.

As described, the transition occurs from in-plane magnetization to perpendicular magnetization in the area having the temperature raise above 70° C. Then, by the exchange coupling force exerted between the read-out film 13 and the recording film 14, the magnetization direction of the recording film 14 is copied to the read-out film 13. Based on the light reflected from the area, the information recorded on the recording film 14 is reproduced utilizing the magneto-optical Kerr effect.

In the present embodiment, since the reflecting film 16 is provided, the magneto-optical effect is enhanced, and the magneto-optical Kerr rotation angle becomes larger. As a result, the information can be more precisely reproduced, thereby improving the quality of the reproducing signal in addition to the effect of the first embodiment.

As described, in the portion other than the portion corresponding to the central portion of the light beam, the temperature of the read-out film 13 is not raised, and in-plane magnetization remains. As a result, since the magneto-optical effect is not shown with respect to the perpendicular incident light beam, effect from the adjacent recording bits can be avoided.

Figure 9:
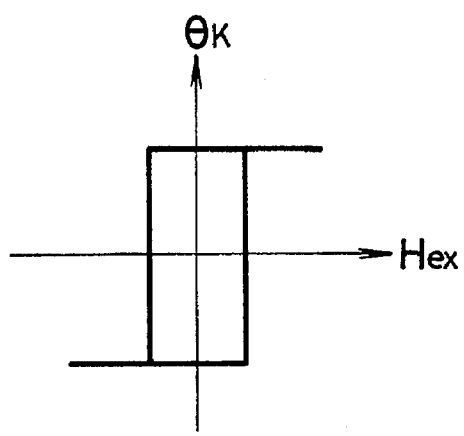
FIG. 9 is an explanatory view showing the relationship between an external magnetic field applied to the read-out film of FIG. 3 and a magnetic Kerr rotation angle in a temperature of $T_1$–$T_2$ when a material which makes the coercive force of the read-out film relatively large is selected for the read-out film.
Figure 10:
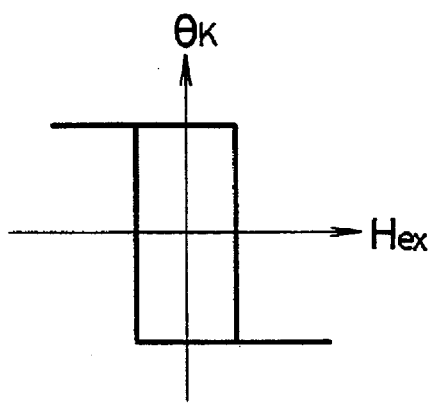
FIG. 10 is an explanatory view showing the relationship between an external magnetic field applied to the read-out film of FIG. 3 and a magnetic Kerr rotation angle in a temperature range of $T_2$–Tc when a material which makes the coercive force of the read-out film relatively large is selected for the read-out film.

In addition, for the read-out film 13 is not limited to $Gd_{0.28}(Fe_{0.8}Co_{0.2})_{0.72}$, more preferably $Gd_{0.28}(Fe_{0.82}Co_{0.18})_{0.72}$ may be used. In replace of $Gd_{0.28}(Fe_{0.8}Co_{0.2})_{0.72}$, $Gd_{0.25}Co_{0.75}$ may be used as well. However, the materials for the read-out film 13 are not limited to the above materials. The read-out film 13 does not necessarily show complete in-plane magnetization as long as it shows substantially in-plane magnetization. For example, $Dy_{0.3}(Fe_{0.7}Co_{0.3})_{0.7}$ which makes the coercive force relatively large may be used as well. When adopting this material, the hysteresis characteristic thereof is as shown in FIGS. 8 through 10.

Figure 8:
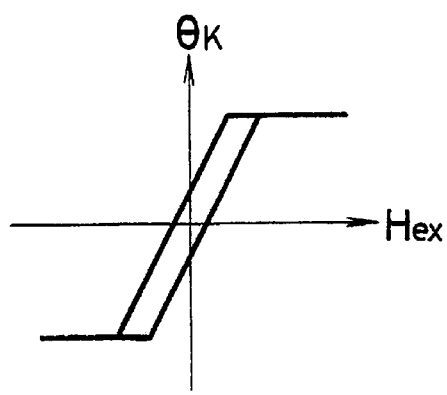
FIG. 8 is an explanatory view showing the relationship between an external magnetic field applied to the read-out film of FIG. 3 and a magnetic Kerr rotation angle in a temperature range of room temperature—$T_1$ when a material which makes the coercive force of the read-out film relatively large is selected for the read-out film.

FIG. 8 shows a relationship between the external applied magnetic field Hex and the magnetic Kerr rotation angle θk (hysteresis characteristic) of the read-out film in the temperature range of room temperature—$T_1$. FIG. 9 shows a relationship between the external magnetic field Hex and the magnetic Kerr rotation angle θk (hysteresis characteristic) of the read-out film in the temperature range of $T_1$–$T_2$. FIG. 10 shows a relationship between the external magnetic field Hex and the magnetic Kerr rotation angle θk (hysteresis characteristic) of the read-out film in the temperature range of $T_2$–Tc.

As can be seen from the above figures, when adopting $Dy_{0.3}(Fe_{0.7}Co_{0.3})_{0.7}$ which makes the coercive force relatively large, the hysteresis characteristic is shown in the whole temperature range (room temperature—Curie temperature Tc). Especially, an abruptly rising hysteresis characteristic is shown in the temperature range of $T_1$–Tc. Here, $T_1$, $T_2$, and Tc represent the same temperatures as the temperatures shown in FIG. 3.

Embodiment 3

The following description will discuss the third embodiment of the present invention with reference to FIGS. 11 through 26.

Figure 11:
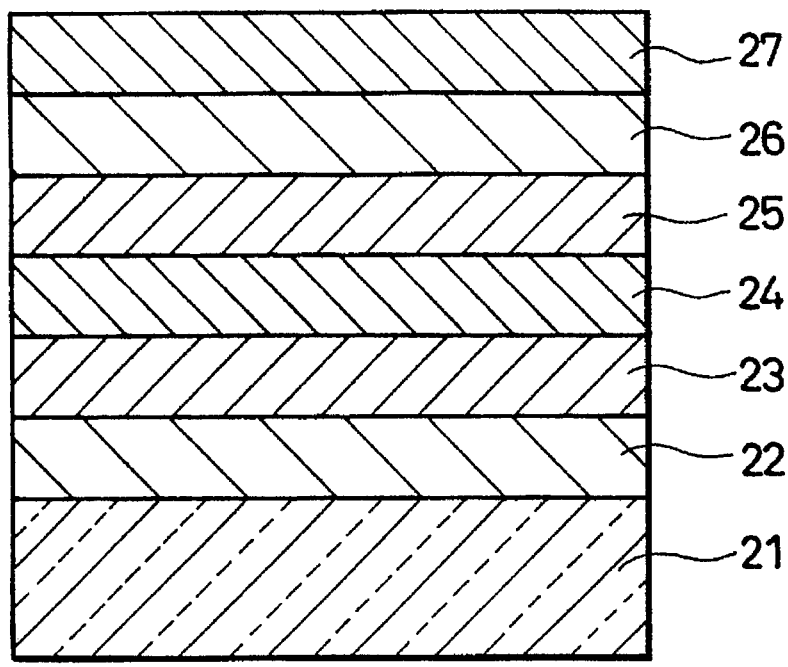
FIG. 11 is a longitudinal cross-sectional view showing a schematic configuration of a magneto-optical memory device adopted in the second embodiment of the present invention.

As shown in FIG. 11, a magneto-optical disk (magneto-optical memory device) in accordance with the present embodiment is provided with a substrate 21 (base) made of a transparent resin such as polycarbonate, whereon a dielectric film 22, a magnetic film 23 (first magnetic film), a magnetic film 24 (second magnetic film), a magnetic film 25 (third magnetic film), a dielectric film 26, and a reflecting film 27 are laminated in this order. The magnetic films 23–25 constitute the recording-reproduction film.

For the magnetic film 23, the following material is used: The material which shows in-plane magnetization at room temperature, and shows perpendicular magnetization at above room temperature. For the magnetic film 24, the magnetic material having Curie temperature set above room temperature is used. For the magnetic film 25, the magnetic material which shows perpendicular magnetization in the temperature range between room temperature and Curie temperature is used.

The Curie temperature of the magnetic film 24 is set lower than that of the magnetic film 25. Further, the magnetic film 23 is arranged such that as the temperature thereof raises from the room temperature, transition occurs from in-plane magnetization to perpendicular magnetization in the temperature range between room temperature and the Curie temperature of the magnetic film 24.

As examples, two kinds of magneto-optical disk A and B were prepared, and three kinds of magneto-optical disks C, D, and E were prepared as comparison examples.

Figure 12:
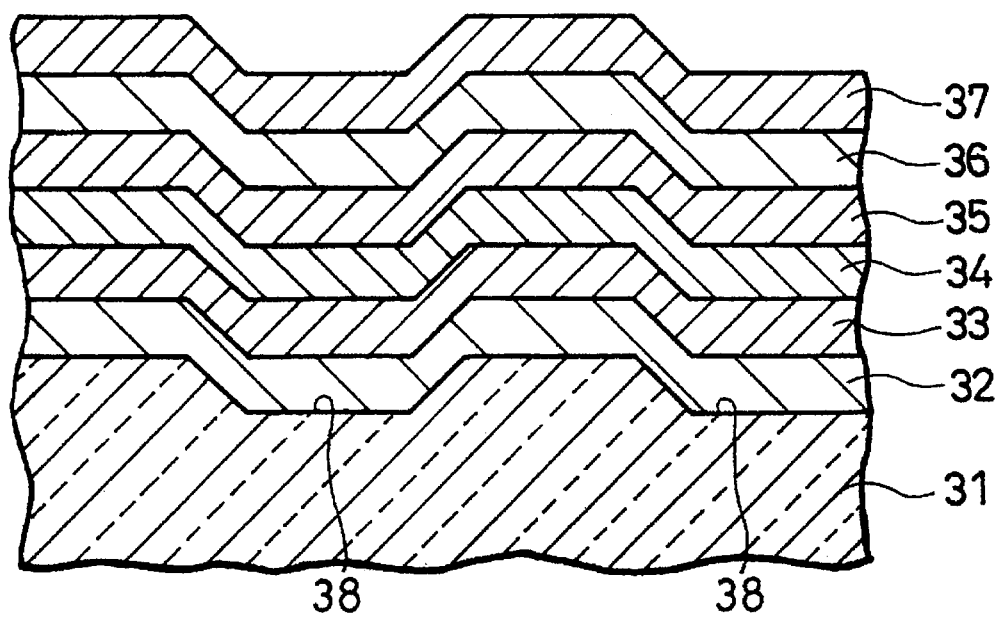
FIG. 12 is a longitudinal cross-sectional view showing a schematic configuration of a magneto-optical disk as an example of the magneto-optical memory device of FIG. 11.

As shown in FIG. 12, each of the magneto-optical disks A, B, D, and E is provided with a substrate 31 (base) including a spiral-shaped pregroove 38, whereon a dielectric film 32, the magnetic film 33 (first magnetic film), the magnetic film 34 (second magnetic film), the magnetic film 35 (third magnetic film), the dielectric film 36, and the reflecting film 37 are laminated in this order. Here, the magnetic films 33–35 constitute a recording-reproduction film.

Figure 13:
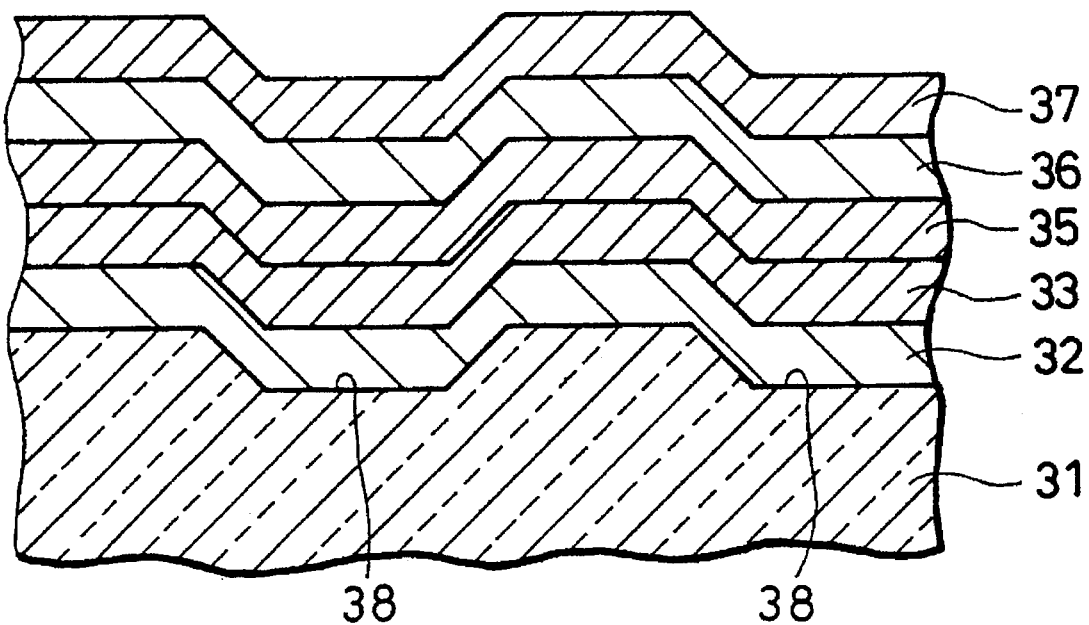
FIG. 13 which shows a comparison example is a longitudinal cross-sectional view showing the schematic configuration of the magneto-optical disk.

As shown in FIG. 13, the magneto-optical disk C is provided with the substrate 31 including a spiral-shaped pregroove 38, whereon the dielectric film 32, the magnetic film 33, the magnetic film 35, the dielectric film 36, and the reflecting film 37 are laminated in this order. Here, the magnetic films 33 and 35 constitute a recording-reproduction film.

A glass is used for the substrate 31. As to the material for the dielectric film 32, AlN with the thickness of 80 nm is used. For the magnetic film 33, a magnetic film a with the thickness of 40 nm (see Table 2) such as $Gd_{0.26}(Fe_{0.80}Co_{0.20})_{0.74}$ is used. For the magnetic film 34, either one of the magnetic films c, b, e, and f (see Table 2) with the thickness of 10 nm is used. As to the material for the magnetic film 35, the magnetic film d with the thickness of 40 nm, such as $Dy_{0.23}(Fe_{0.80}Co_{0.20})_{0.77}$ is used. For the dielectric film 36, AlN with the thickness of 20 nm is used. For the reflecting film 37, Al with the thickness of 30 nm is used.

The magnetic film a made of GdFeCo is RE-rich at room temperature. The compensation temperature of the magnetic film a is 270° C., and the Curie temperature thereof is set at 380° C. The magnetic film b made of GdFeCo is RE-rich in the temperature range between room temperature and Curie temperature (160° C.). The magnetic film c made of GdFeCo is RE-rich in the temperature range between room temperature and Curie temperature (250° C.).

On the other hand, the magnetic film d made of DyFeCo is TM-rich in the temperature range between room temperature and Curie temperature (230° C.). The magnetic film e made of DyFeCo is TM-rich in the temperature range between room temperature and Curie temperature (160° C.). The magnetic film f made of DyFeCo is TM-rich in the temperature range between room temperature and Curie temperature (250° C.).

Here, RE-rich at room temperature indicates that the content of RE (rare-earth metal) is greater than the content of RE when the compensation temperature is set at room temperature. RE-rich from room temperature to Curie temperature indicates that the content of RE is greater than the maximum content of RE when the compensation temperature is set in the range between room temperature and Curie temperature. TM-rich from room temperature to Curie temperature indicates that the content of TM (transition metal) is greater than the maximum content of TM when the compensation temperature is set in the range between room temperature and Curie temperature.

The magnetic film a is used as a read-out film. The compensation temperature thereof is set higher than the compensation temperature (in the vicinity of 100° C.) of the read-out film 3 used in the first embodiment in the following reason: The magnetic film a is arranged so as to exhibit perpendicular magnetization in the temperature range of 130°–280° C., and reproduction is carried out from the portion corresponding to the central portion of the light spot of the light beam, having the temperature above 130° C.

This means that the area of the reproducing portion which exhibits perpendicular magnetization is smaller than the reproducing portion (area having temperature rise above 70° C.) of the first embodiment. Since the arrangement of the third embodiment enables the recording bits smaller than the first embodiment to be reproduced, it is more suitable for the high density reproduction.

Figure 14:
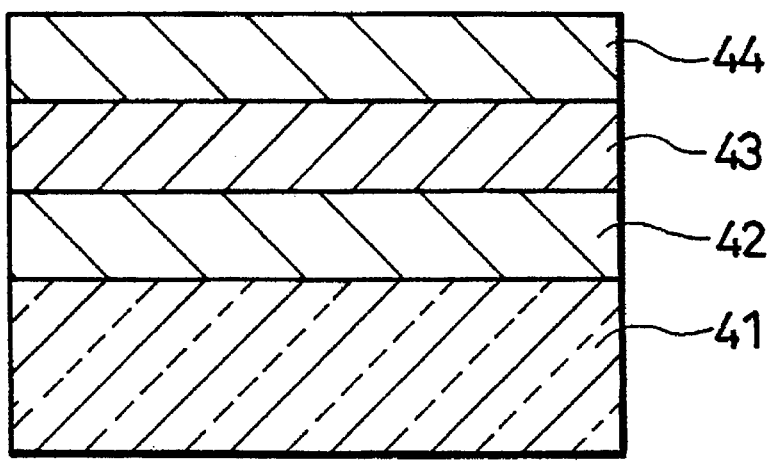
FIG. 14 is a longitudinal cross-sectional view showing the schematic configuration of a sample used in measuring the respective characteristics of the magnetic films a–f designed for the magnetic films of the magneto-optical memory device of FIG. 11.
Figure 15:
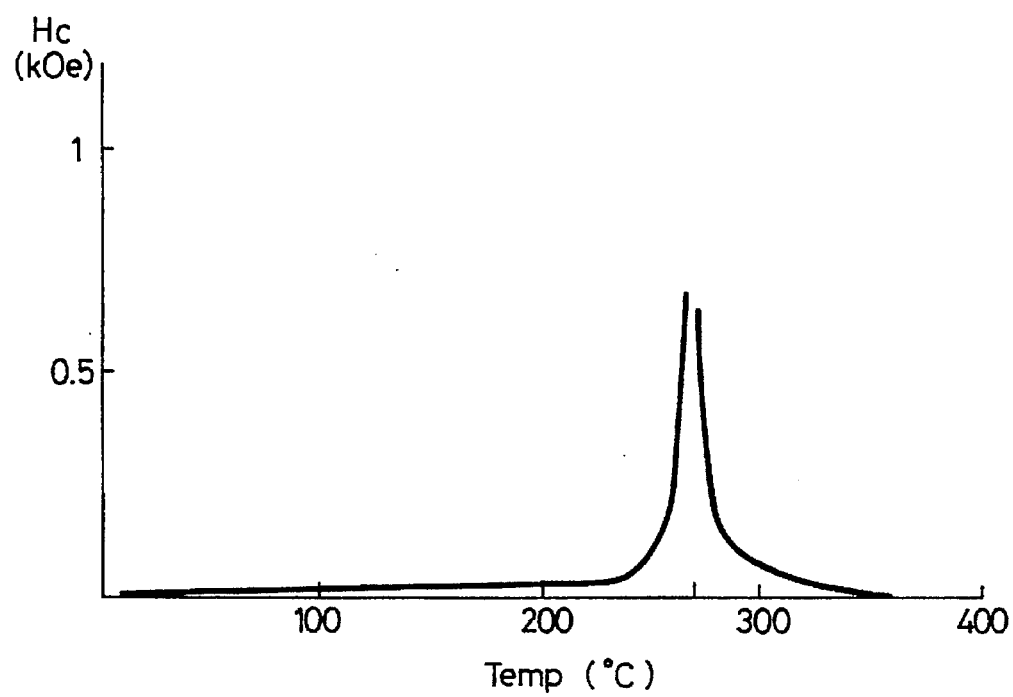
FIG. 15 is graph showing the results of measured temperature dependency of the coercive force of the magnetic film a using the sample of FIG. 14.
Figure 16:
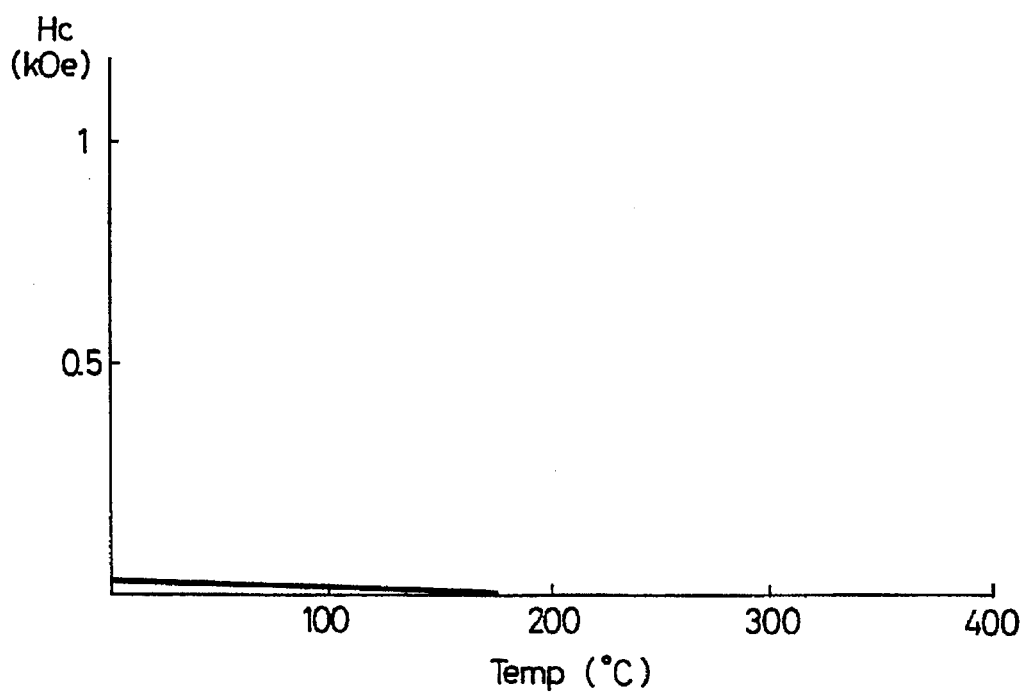
FIG. 16 is graph showing the results of measured temperature dependency of the coercive force of the magnetic film b using the sample of FIG. 14.
Figure 17:
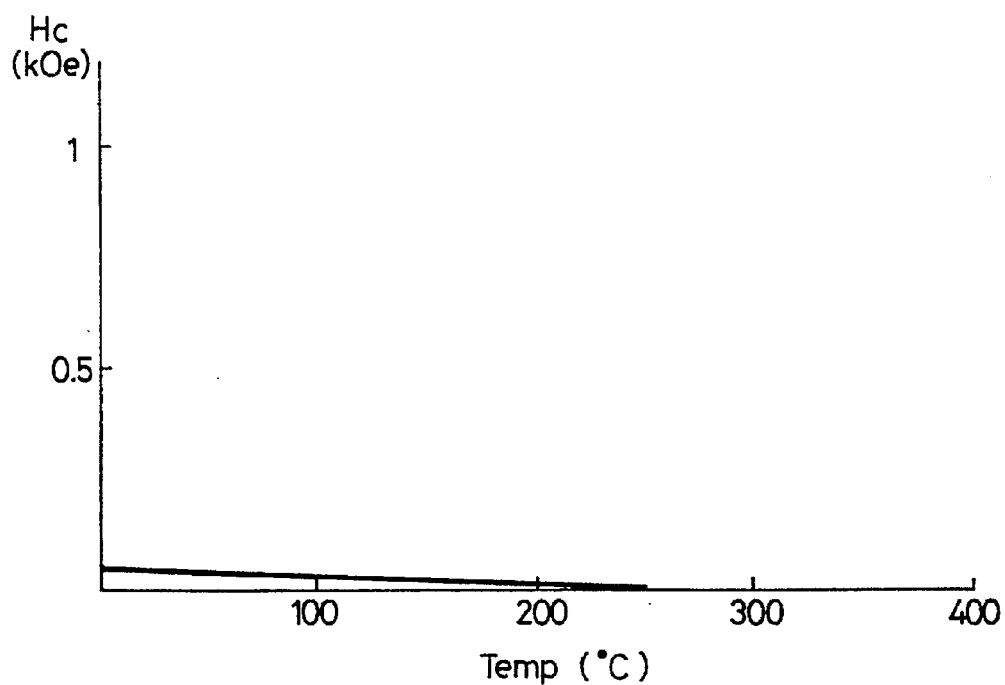
FIG. 17 is graph showing the results of measured temperature dependency of the coercive force of the magnetic film c using the sample of FIG. 14.
Figure 18:
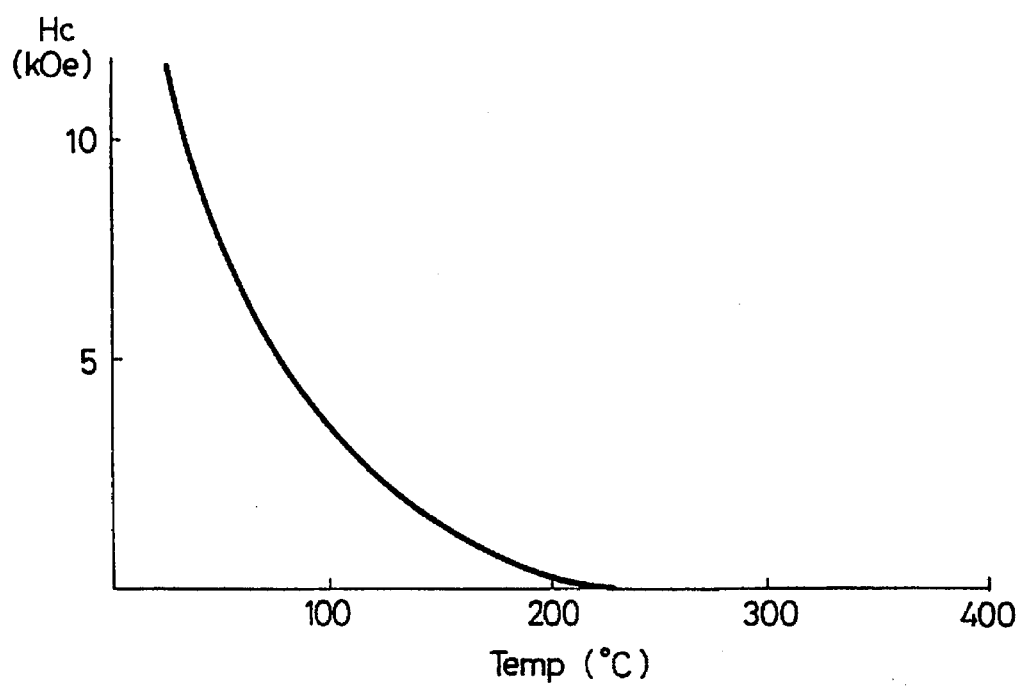
FIG. 18 is graph showing the results of measured temperature dependency of the coercive force of the magnetic film d using the sample of FIG. 14.
Figure 19:
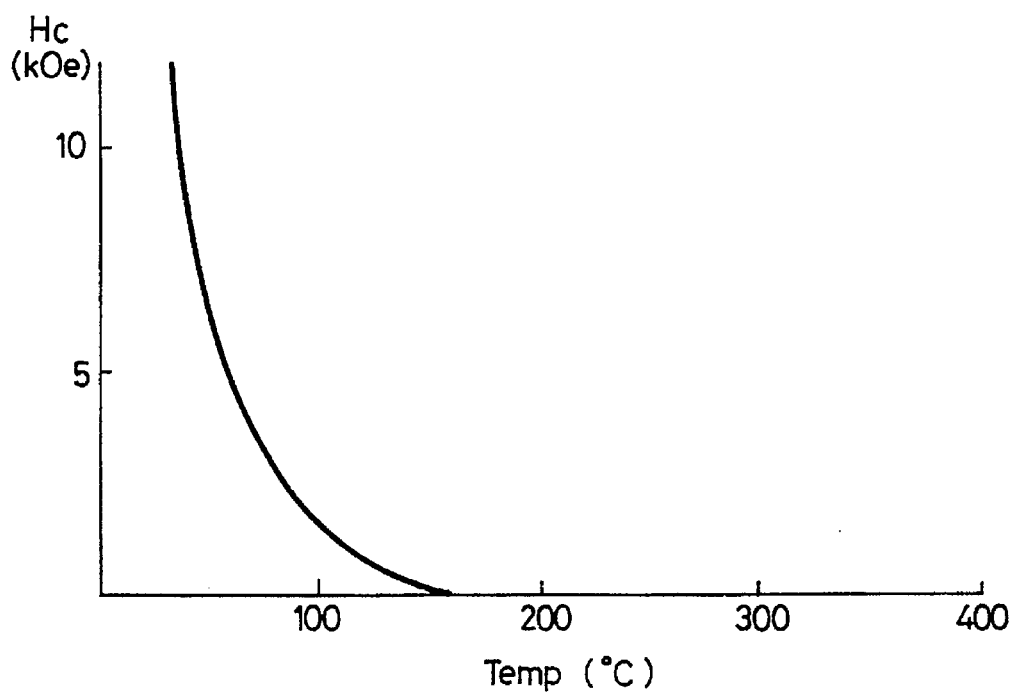
FIG. 19 is graph showing the results of measured temperature dependency of the coercive force of the magnetic film e using the sample of FIG. 14.
Figure 20:
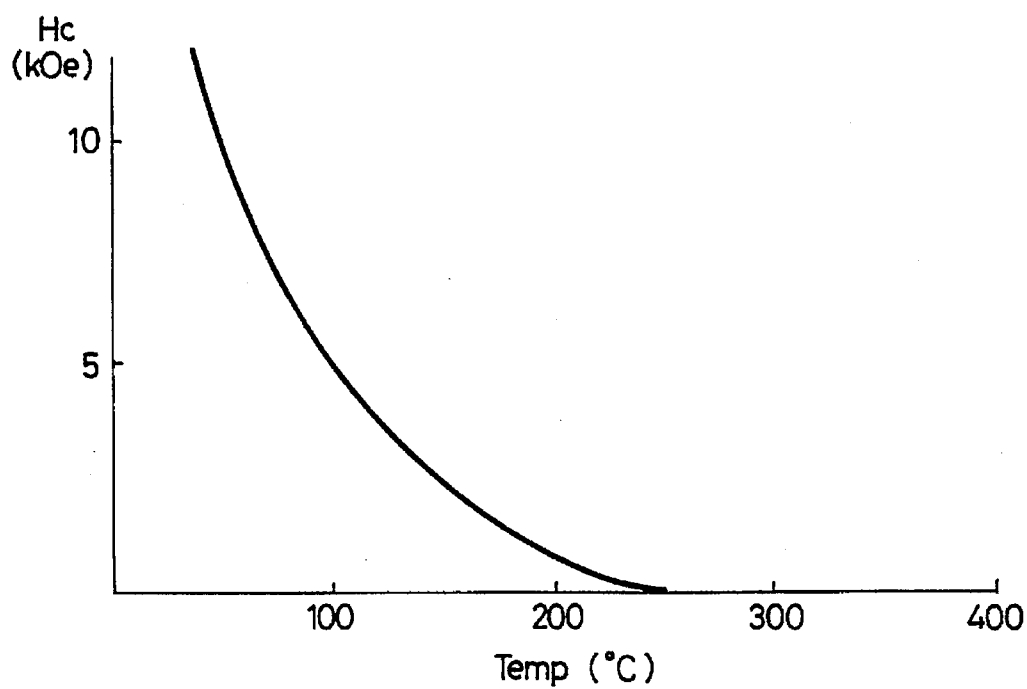
FIG. 20 is graph showing the results of measured temperature dependency of the coercive force of the magnetic film f using the sample of FIG. 14.
Figure 21:
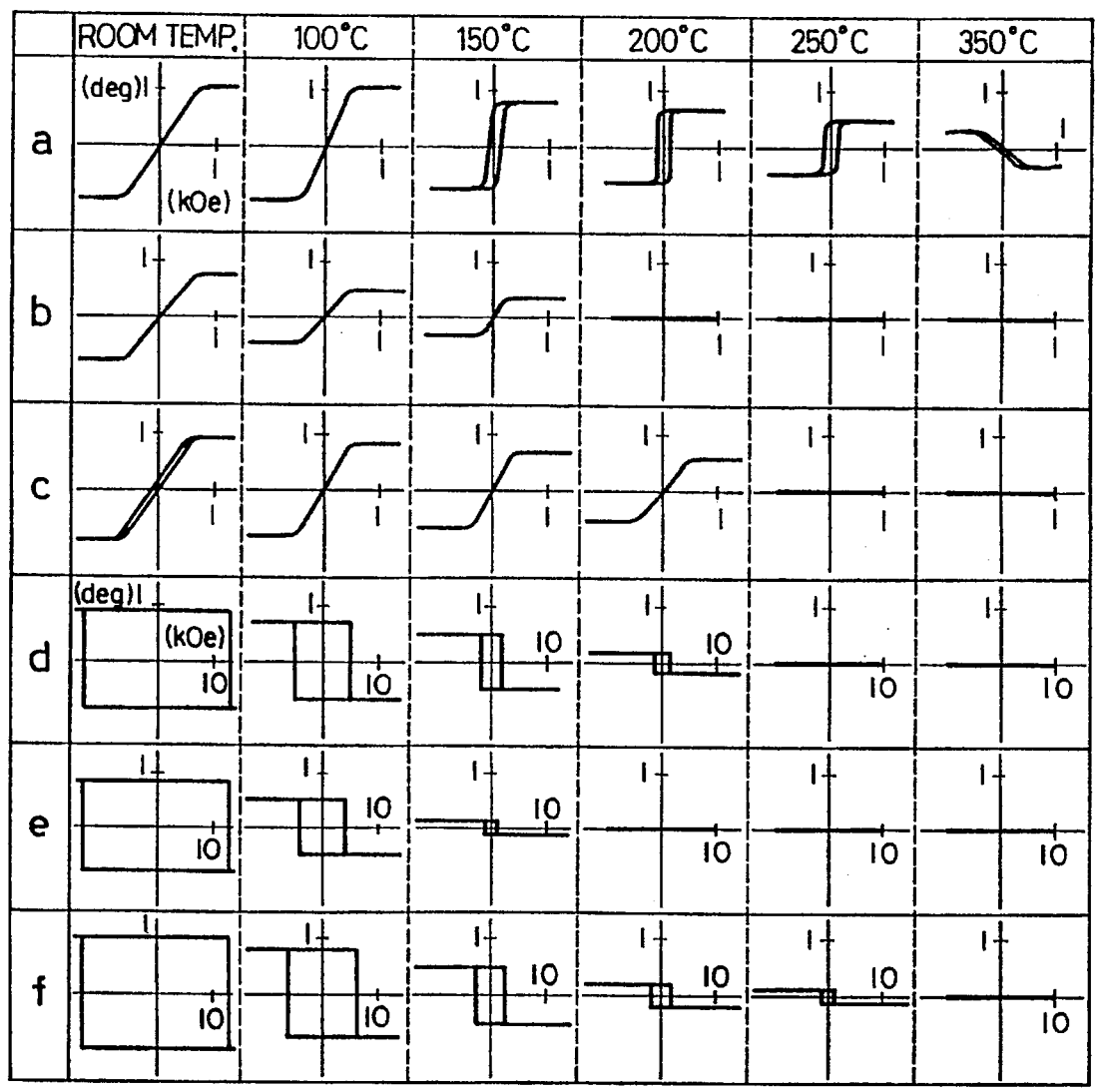
FIG. 21 is a graph showing the results of measured temperature dependency of the Kerr loops of the magnetic films a–f using the sample of FIG. 14.

As shown in FIG. 14, the magnetic characteristic is measured using the sample provided with the substrate 41 whereon an AlN film 42, a magnetic film 43 corresponding to either one of the magnetic films a–f, and the AlN film 44 (coating film) are laminated in this order. FIGS. 15 through 20 show respective temperature dependencies of the coercive forces (Hc) of the magnetic films a–f. The coercive force of the third magnetic layer is always stronger than the coercive force of the second magnetic layer in a temperature range of from not less than room temperature to less than the Curie temperature ($T_3$) of the third magnetic layer. FIG. 21 shows temperature dependencies of Kerr loops of the magnetic films a–f respectively. Here, the Kerr loop indicates hysteresis characteristic of the Kerr rotation angle with respect to the change in the external magnetic field.

Table 1 shows the magnetic films a–f used for the magnetic films 33–35 of the magneto-optical disks A–E. Table 2 shows respective compositions and magnetic characteristics of the magnetic films a–f. In Table 2, the transition indicates that the magnetization direction is in-plane magnetization at room temperature, and it is perpendicular magnetization in a predetermined temperature range above room temperature.

TABLE 1

|  | A | B | C | D | E |
| --- | --- | --- | --- | --- | --- |
| magnetic film 33 | a | a | a | a | a |
| magnetic film 34 | b | e | — | c | f |
| magnetic film 35 | d | d | d | d | d |

Using the above magneto-optical disks A–E, the recording bits with the size of 0.5 µm were recorded while modulating the size of the external magnetic field. Then, the recording bits were reproduced, and the C/N ratio (carrier/noise ratio) was measured. In the experiment, linear velocity of the magneto-optical disks A–E, the laser power when recording, and the laser power when reproducing were set respectively 5 m/s, 8 mW, and 2 mW. The results of the experiment using the magneto-optical disks A–E are shown in FIGS. 22 through 26.

Figure 22:
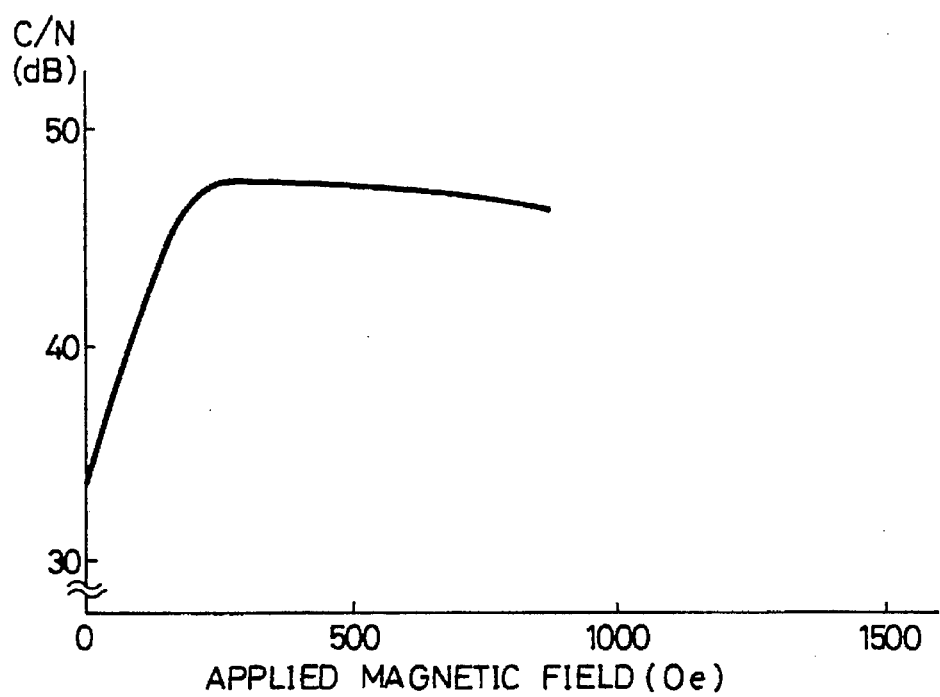
FIG. 22 is a graph showing the results of measured relationship between C/N ratio and the size of the external magnetic field using a magneto-optical disk A.
Figure 23:
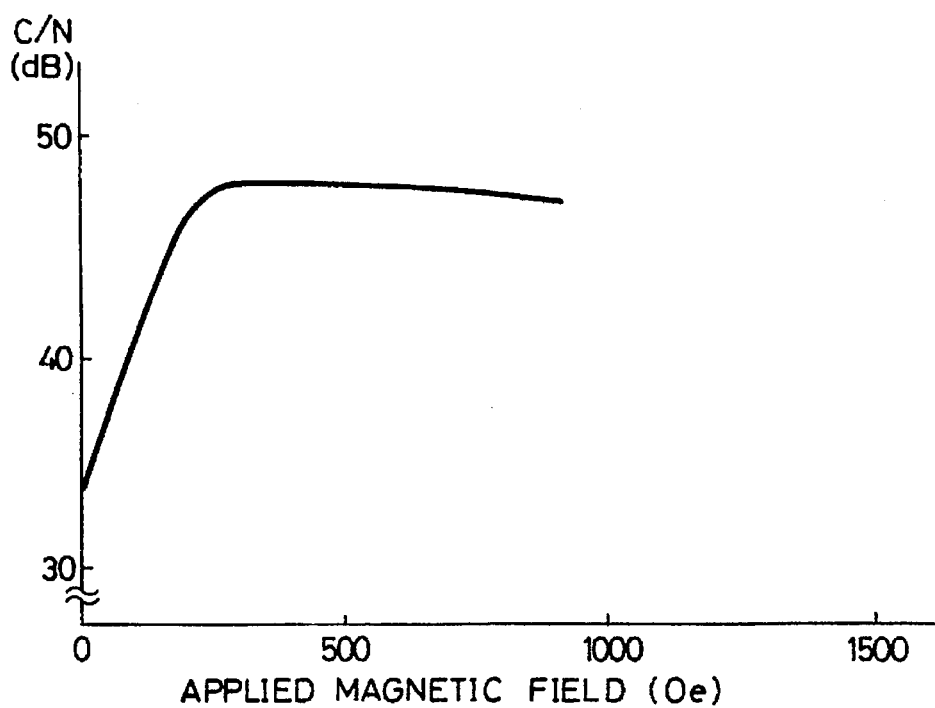
FIG. 23 is a graph showing the result of measured relationship between C/N ratio and the size of the external magnetic field using a magneto-optical disk B.
Figure 24:
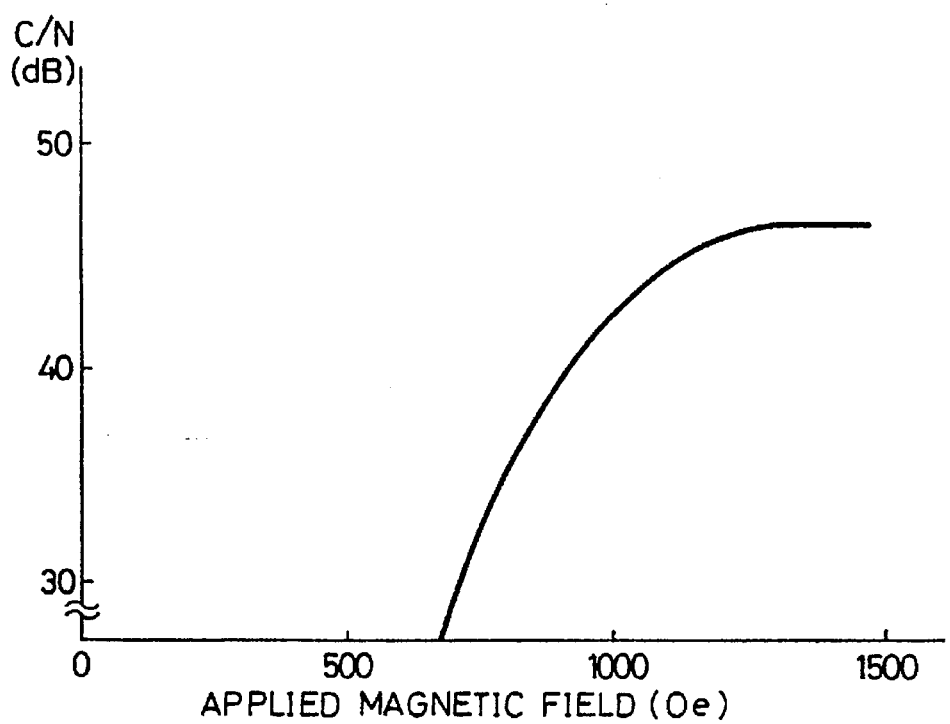
FIG. 24 is a graph showing the result of measured relationship between C/N ratio and the size of the external magnetic field using a magneto-optical disk C.
Figure 25:
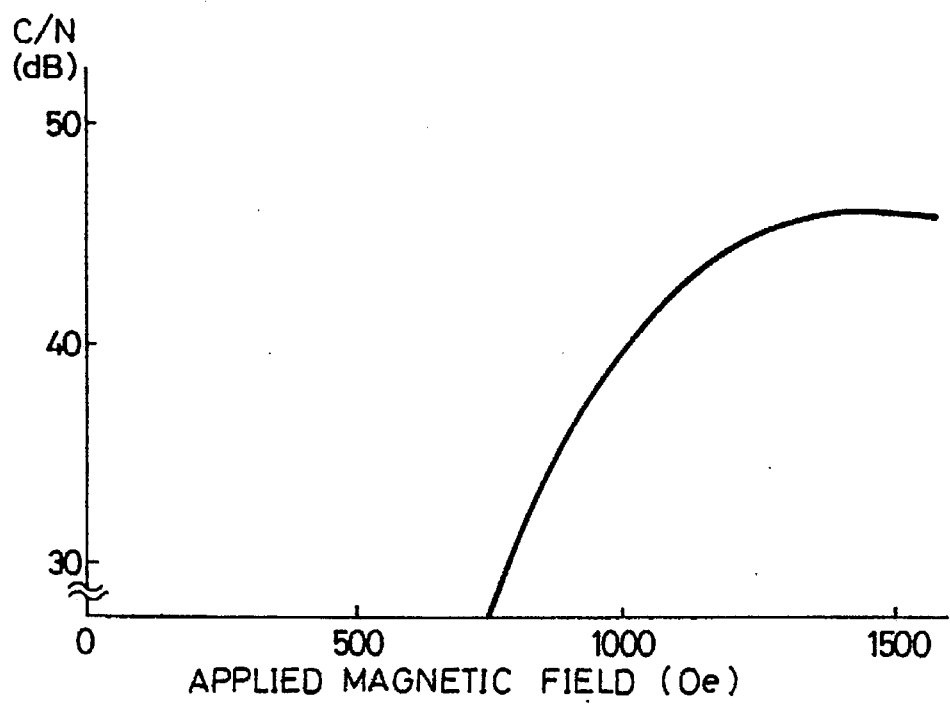
FIG. 25 is a graph showing the result of measured relationship between C/N ratio and the size of the external magnetic field using a magneto-optical disk D.
Figure 26:
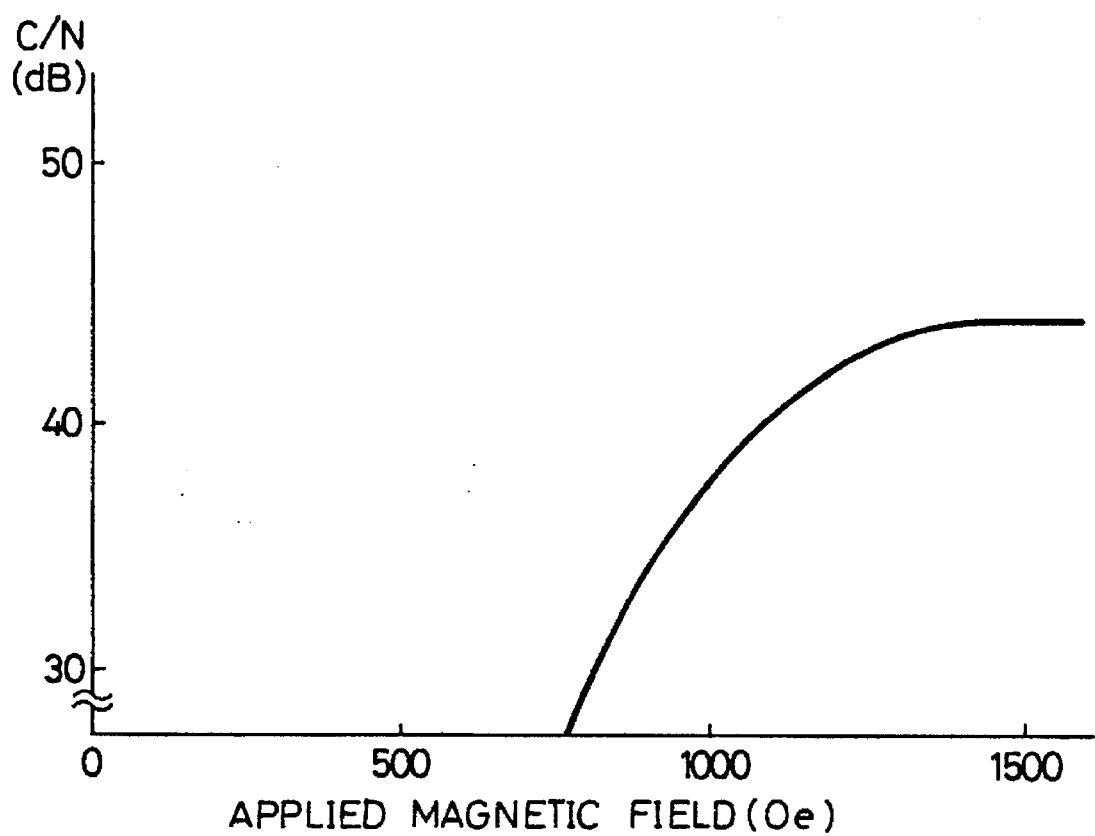
FIG. 26 is a graph showing the result of measured relationship between C/N ratio and the size of the external magnetic field using a magneto-optical disk E.
Figure 27:
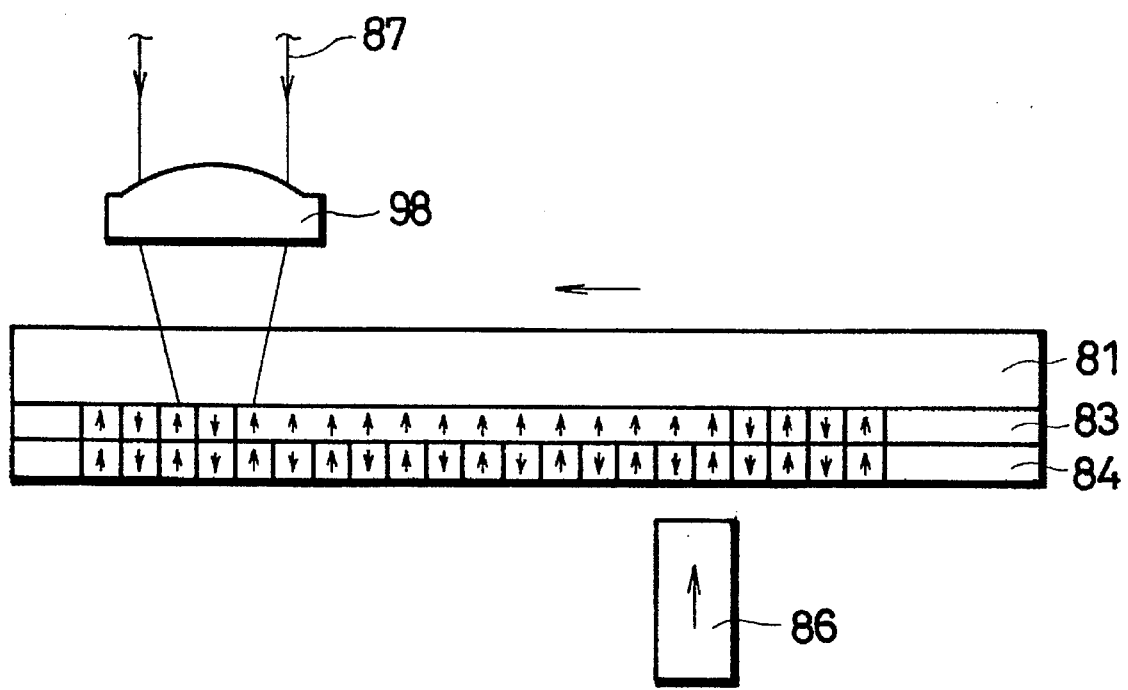
FIG. 27 is an explanatory view showing a reproducing operation from a conventional magneto-optical disk which permits high density reproduction.

As can be seen from FIGS. 22 and 23, as to the magneto-optical disks A and B, when the size of the external magnetic field was set above 200 Oe, the C/N ratio above 45 dB was measured. On the other hand, as to the magneto-optical disks C, D and E, the C/N ratio above 45 dB was not measured until the external magnetic field was set above 1000 Oe as shown in FIGS. 24 and 26.

As described, each of the magneto-optical disks A and B is provided with the magnetic film 34 between the magnetic film 33 and the magnetic film 35, and the Curie temperature of the magnetic film 34 is set lower than that of the magnetic film 35. On the other hand, the magneto-optical disk C is not provided with the magnetic film 34. As to the magneto-optical disks D and E, although each of which is provided with the magnetic film 34, the Curie temperature of the magnetic film 34 is set higher than the Curie temperature of the magnetic film 35. When the magneto-optical disks A and B were used, the recording was permitted with a small external magnetic field. However, when the magneto-optical disks C, D, and E were used, the recording was permitted only with a large external magnetic field.

From the result of the experiment using the magneto-optical disks A and B, both the perpendicular magnetization film and the in-plane magnetization film may be used for the magnetic film 34.

As described, the magneto-optical disk of the present embodiment is arranged so as to be provided with the substrate 31 whereon the magnetic film 33 which exhibits in-plane magnetization at room temperature, and exhibits perpendicular magnetization in a predetermined temperature range above room temperature, the magnetic film 34 whose Curie temperature is set above room temperature, and the magnetic film 35 which exhibits perpendicular magnetization in the temperature range between room temperature and the Curie temperature are laminated in this order.

In the above arrangement, when reproducing, the information recorded on the magnetic film 35 at high density can be reproduced by the exchange coupling force exerted among the magnetic films 33, 34, and 35. Namely, the recording bits recorded with an interval smaller than the diameter of the light spot can be reproduced.

In the conventional model, in order to reproduce the recording bits recorded with an interval smaller than the diameter of the light spot, subsidiary magnetic field for initializing the magnetic film (read-out film) is required, and for generating the subsidiary magnetic field, a magnetic field generation device is provided.

However, in the arrangements of the above embodiments, the magnetic field generation device for generating the subsidiary magnetic field is not required. Thus, the apparatus can be made smaller, and the electric power consumption can be reduced.

Moreover, when recording, since the magnetic film 34 whose Curie temperature is set lower than the Curie temperature of the magnetic film 35 is provided between the magnetic films 33 and 35, the temperature of the magnetic film 35 can be raised above the vicinity of its Curie temperature. Thus, the temperature of the magnetic film 34 can be also raised above its Curie temperature, and the magnetization disappears from the magnetic film 34. As a result, the exchange coupling force is not exerted between the magnetic films 33 and 35.

By providing the magnetic film 34, the magnetic film 35 can be avoided from being affected by the magnetic film 33. The magnetic film 34 also serves to prevent the external magnetic field by leakage from the magnetic film 35. This permits the information of the recording bits to be recorded onto the magnetic film 35 using the external magnetic field smaller than that required in the conventional model.

TABLE 2

|  | composition | film (nm) thick. | Hc (kOe) at Troom | Tcomp (C.°) | Tc (C.°) | magnet. direction |
| --- | --- | --- | --- | --- | --- | --- |
| a | $Gd_{0.26}(Fe_{0.80}Co_{0.20})_{0.74}$ | 40 | 0.03 | 270 | 380 | transition |
| b | $Gd_{0.28}(Fe_{0.90}Co_{0.10})_{0.72}$ | 10 | 0.02 | — | 160 | in-plane |
| c | $Gd_{0.28}(Fe_{0.85}Co_{0.15})_{0.72}$ | 10 | 0.02 | — | 250 | in-plane |
| d | $Dy_{0.23}(Fe_{0.80}Co_{0.20})_{0.77}$ | 40 | 13 | — | 230 | perpend. |
| e | $Dy_{0.22}(Fe_{0.90}Co_{0.10})_{0.78}$ | 10 | 13 | — | 160 | perpend. |
| f | $Dy_{0.24}(Fe_{0.77}Co_{0.23})_{0.76}$ | 10 | 14 | — | 250 | perpend. |

As described, the magneto-optical memory devices A and B of the present embodiment permits a reduction in the strength of the external magnetic field required when recording. This can be achieved in the following reason: The portion of the magnetic film 34 whose temperature is raised above its Curie temperature, the exchange coupling force is not exerted between the magnetic film 33 and the magnetic film 35. Therefore, the effect from the magnetization of the magnetic film 33 can be avoided. As a result, the recording onto the magnetic film 35 can be more easily carried out.

In the above arrangement, in the case where the external magnetic field is generated using the electro-magnet, electric power consumption when recording can be reduced. When a magnet is used for generating the external magnetic field, by adopting the magnet smaller that required in the conventional model, the apparatus can be made more compact.

In the described embodiments 1–3, the magneto-optical disk has been used as an example of the magneto-optical memory device. However, the present invention is not limited to this. For example, a magneto-optical card or a magneto-optical tape may be used as well. When adopting the magneto-optical tape, in stead of the substrate 31, a tape base (base) such as polyethylene terephthalate may be used as well.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical memory medium, comprising:

a first magnetic film which exhibits in-plane magnetization at room temperature and exhibits perpendicular magnetization in a predetermined temperature range above room temperature;

a second magnetic film whose Curie temperature (T2) is set above room temperature; and a third magnetic film which exhibits perpendicular magnetization in a temperature range between room temperature and its Curie temperature (T3), wherein said third magnetic film is an alloy whereon recorded information is rewritten by overwriting using a magnetic field intensity modulation, said first magnetic film, said second magnetic film and said third magnetic film being laminated in this order on a base substrate, wherein:

the Curie temperature (T2) of said second magnetic film is set lower than the Curie temperature (T3) of said third magnetic film;

in a temperature range from not less than room temperature to less than Curie temperature ($T_3$) of said third magnetic layer, said third magnetic layer has a coercive force $H_{c3}$ which is always stronger than a coercive force $H_{c2}$ of said second magnetic layer; and the Curie temperature (T3) of said third magnetic film is lower than the Curie temperature (T1) of said first magnetic film.

2. The magneto-optical memory medium as set forth in claim 1, wherein:

said third magnetic film is a recording film for recording thereon information based on a magnetization direction.

3. The magneto-optical memory medium as set forth in claim 2, wherein:

said first magnetic film is a read-out film whereon a light beam is projected from the side of said base so as to raise the temperature of the portion thereof corresponding to a central portion of the light beam in a predetermined temperature range;

as the temperature rises, a transition occurs in said first magnetic film from in-plane magnetization to perpendicular magnetization;

the information recorded on said third magnetic film is copied through said second magnetic film to said first magnetic film; and by projecting the light beam, the copied information is read out utilizing the Kerr effect.

4. The magneto-optical memory medium as set forth in claim 2, wherein:

when the temperature of said third magnetic film is raised to the vicinity of its Curie temperature (T3) by projecting a light beam, so as to record thereon information by applying thereto an external magnetic field, the magnetization of said second magnetic film disappears, and said second magnetic film serves as a switching film by cutting off influence of the magnetization of said first magnetic film on the magnetization of said third magnetic film.

5. The magneto-optical memory medium as set forth in claim 1, wherein:

said first magnetic film is made of a rare-earth/transition metal alloy whose composition is set at rare-earth-moment-rich composition at room temperature, indicating that the magnetic moment of said rare-earth metal is greater than that of said transition metal at room temperature.

6. The magneto-optical memory medium as set forth in claim 5, wherein:

said first magnetic film exhibits in-plane magnetization in a temperature range between room temperature and a temperature below 130° C., whereas, it exhibits perpendicular magnetization in a temperature range of 130°–280° C.

7. The magneto-optical memory medium as set forth in claim 6, wherein:

said first magnetic film is made of $Gd_{0.26}(Fe_{0.80}Co_{0.20})_{0.74}$.

8. The magneto-optical memory medium as set forth in claim 1, wherein:

said first magnetic film is made of rare-earth transition metal alloy, and it exhibits in-plane magnetization in a temperature range between room temperature and a temperature below 70° C., whereas, it exhibits perpendicular magnetization in a temperature range of 70° C.—Curie temperature.

9. The magneto-optical memory medium as set forth in claim 8, wherein:

said first magnetic film is made of $Gd_{0.28}(Fe_{0.8}Co_{0.2})_{0.72}$.

10. The magneto-optical memory medium as set forth in claim 8, wherein:

said first magnetic film is made of $Gd_{0.28}(Fe_{0.82}Co_{0.18})_{0.72}$.

11. The magneto-optical memory medium as set forth in claim 1, wherein:

said first magnetic film is made of GdCo.

12. The magneto-optical memory medium as set forth in claim 11, wherein:

said first magnetic film is made of $Gd_{0.25}Co_{0.75}$.

13. The magneto-optical memory medium as set forth in claim 1, wherein:

said first magnetic film is made of $Dy_{0.3}(Fe_{0.7}Co_{0.3})_{0.7}$.

14. The magneto-optical memory medium as set forth in claim 1, wherein:

said second magnetic film is rare-earth-moment-rich in a temperature range between room temperature and Curie temperature;

said second magnetic film exhibits in-plane magnetization in the temperature range between room temperature and Curie temperature; and said second magnetic film is made of a rare-earth/ transition metal alloy whose composition is set such that its Curie temperature is set higher than the lowest temperature at which said first magnetic film exhibits perpendicular magnetization, rare-earth-moment-rich in a temperature range between room temperature and Curie temperature, indicating that the magnetic moment of said rare-earth metal is greater than that of said transition metal in a temperature range between room temperature and Curie temperature.

15. The magneto-optical memory medium as set forth in claim 14, wherein:

said second magnetic film is made of GdFeCo.

16. The magneto-optical memory medium as set forth in claim 15, wherein:

said second magnetic film is made of $Gd_{0.28}(Fe_{0.90} Co_{0.10})_{0.72}$.

17. The magneto-optical memory medium as set forth in claim 1, wherein:

said second magnetic film is transition-metal-moment-rich in a temperature range between room temperature and Curie temperature;

said second magnetic film exhibits in-plane magnetization in the temperature range between room temperature and Curie temperature; and said second magnetic film is made of rare-earth/transition metal alloy whose composition is set such that its Curie temperature is set higher than the lowest temperature at which said first magnetic film exhibits perpendicular magnetization, is transition-metal-moment-rich in a temperature range between room temperature and Curie temperature, indicating that the magnetic moment of said transition metal is greater than that of said rare-earth metal, in a temperature range between room temperature and Curie temperature.

18. The magneto-optical memory medium as set forth in claim 17, wherein:

said second magnetic film is made of DyFeCo.

19. The magneto-optical memory medium as set forth in claim 18, wherein:

said second magnetic film is made of $Dy_{0.22}(Fe_{0.90} Co_{0.10})_{0.78}$.

20. The magneto-optical memory medium as set forth in claim 1, wherein:

said third magnetic film is made of rare-earth/transition metal alloy whose composition is set such that it is transition-metal-moment-rich in a temperature range between room temperature and its Curie temperature.

21. The magneto-optical memory medium as set forth in claim 20, wherein:

said third magnetic film is made of $Dy_{0.23}(Fe_{0.80} Co_{0.20})_{0.77}$.

22. The magneto-optical memory medium as set forth in claim 1, wherein:

said third magnetic film is made of $Dy_{0.23}(Fe_{0.82} Co_{0.18})_{0.77}$.

23. The magneto-optical memory medium as set forth in claim 1, wherein:

a first dielectric film having a characteristic that light can be transmitted therethrough is formed between said base and said first magnetic film, said first dielectric film serving as a protective coat;

a second dielectric film having a characteristic that light can be transmitted therethrough is formed on said third magnetic film, said second dielectric film serving as a protective coat; and a reflecting film is formed on said second dielectric film for enhancing the magneto-optical effect.

24. The magneto-optical memory medium as set forth in claim 23, wherein:

said first and second dielectric films are made of AlN;

said reflecting film is made of Al; and said base is composed of a base having a characteristic that light can be transmitted therethrough.

* * * * *